July 10, 1928.
A. WEILAND
UNIVERSAL JOINT
Filed May 5, 1926
1,676,676
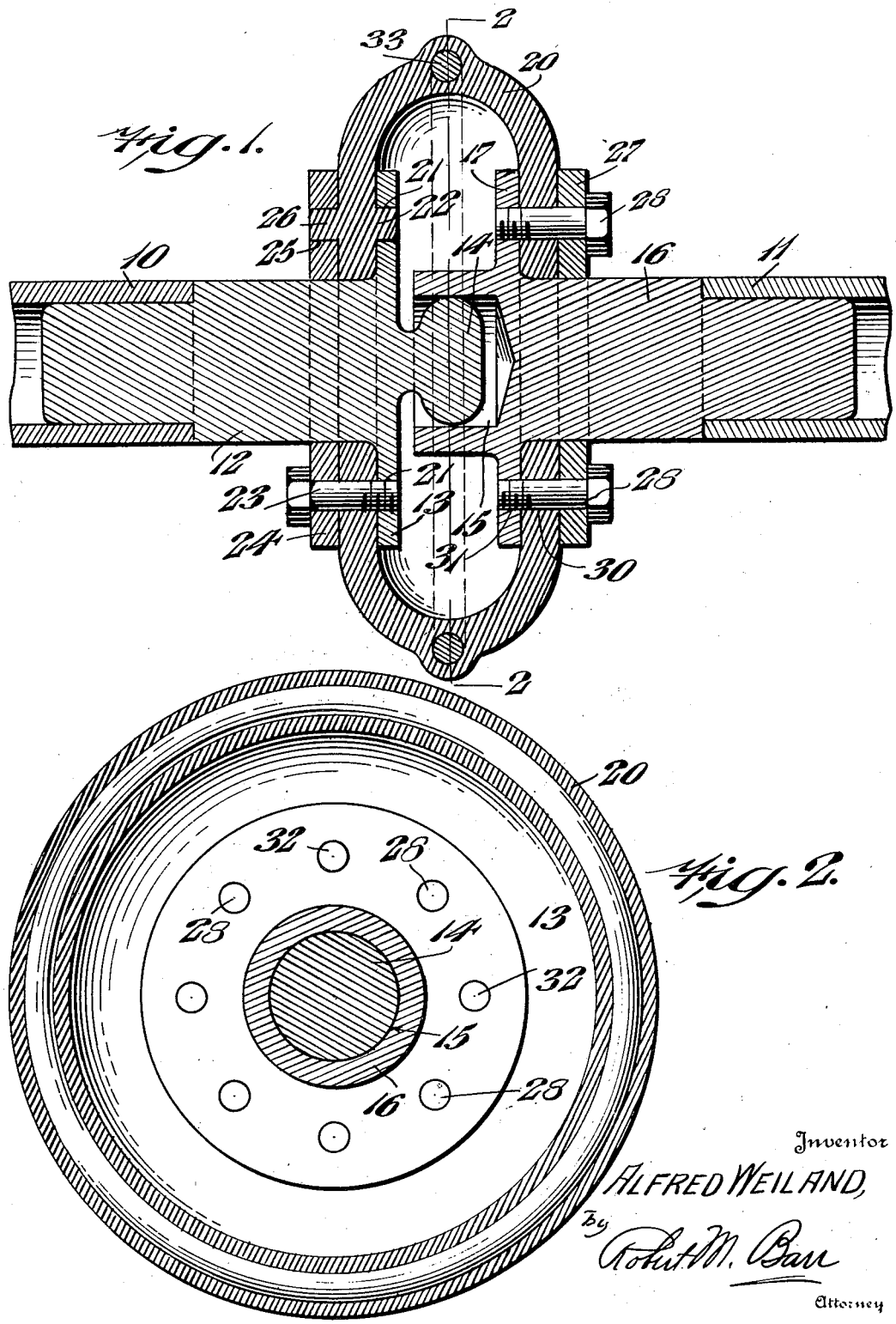

Patented July 10, 1928.

1,676,676

UNITED STATES PATENT OFFICE.

ALFRED WEILAND, OF NESHANIC, NEW JERSEY, ASSIGNOR TO PNEUMATIC APPLIANCES CORPORATION, OF NEW YORK, N. Y., A CORPORATION OF DELAWARE.

UNIVERSAL JOINT.

Application filed May 5, 1926. Serial No. 106,869.

The present invention relates to means for transmitting power from a driving element, and relates more particularly to an improved universal joint.

Some of the objects of the present invention are to provide a simple and efficient connection between a driving part and a driven part whereby relative movement between the two parts can take place in any direction; to provide a non-rattling universal joint; to provide a universal joint wherein the usual mechanical slip joint is eliminated; to provide a joint for relatively movable parts which can be manufactured at small cost; to provide for expansion and contraction between two parts by a universal connection wherein metal to metal contact is eliminated between otherwise contacting faces subject to wear and rattle; and to provide other improvements as will hereinafter appear.

In the accompanying drawings Fig. 1 represents a vertical section of a universal joint embodying one form of the present invention; and Fig. 2 represents a section on line 2—2 of Fig. 1.

Referring to the drawings, one form of the present invention is shown interposed between a driving shaft 10 and a driven shaft 11, the former receiving power from any suitable source, such as an automobile engine, and the latter transmitting the motion to the rear axle of the vehicle. Preferably the shafts 10 and 11 are of tubular type, though this is not a necessary requirement, and one terminates in a head 12 rigidly fixed thereto and having a flange 13 provided with an axially projecting ball-like bearing member 14 which fits within a bore 15 of a second head 16 fast to the shaft 11. The bore 15 is axially located and of cylindrical contour to ride about the surface of the bearing member 14, and its length is sufficient to allow relative axial movement between the shafts 10 and 11 without unseating the member 14. A flange 17 is formed on the head 16 preferably of the same general dimensions as the flange 13, and in assembled condition the two flanges 13 and 17 face each other in suitable spaced relation so as not to interfere in any way with the required relative movement of the parts.

For the purpose of connecting the flanges 13 and 17 to provide an efficient non-rattling joint an expansible member 20 of rubber or other suitable flexible resilient material is molded about the respective heads 12 and 16 and in finished condition is in the form of a hollow disc with the flange 13 abutting one inner wall and the flange 17 abutting the other and opposite inner wall. At suitable circumferential spaced intervals the flange 13 is provided with holes 21 in some of which molded lugs 22 of the disc seat while in others fastening studs 23 are threaded after passing through a clamping plate 24 and the wall of the member 20. This plate 24 is provided with holes 25 matched as to the holes 21, some of which receive the studs 23 and the remainder receive molded lugs 26 complemental to the lugs 22. Thus the head 12 is rigidly clamped to one wall of the disc member 20 with rubber to metal contact at all meeting faces. Preferably a similar means is employed for joining the flange 17 to the opposite wall of the flexible member 20 consisting of an outer clamping plate 27 held by studs 28 which traverse the wall of the member 20 and thread into the flange 17. At intervals the stud holes 30 of the member 20 and the holes 31 of the flange 17 may receive respectively molded lugs 32 of the member 20 in place of the studs 28 whereby the strength of the fastening means is maintained while the rubber to metal non-rattling result is obtained about the circumference of the flange 17.

In order to produce the desired flexibility to the structure, the member 20 has an inner diameter somewhat greater than the diameter of the flanges 13 and 17 so that the peripheral portion of the member 20 is free to expand or contract according as tension or compression is applied by the relative movement of the shafts 10 and 11. It may be found desirable to mold a steel ring 33 into the member 20 in its medial plane for the purpose of stiffening the wall about its periphery where the flexing strain is more or less concentrated.

The bearing joint formed by the ball member 14 and bore 15 is preferably maintained in lubricated condition by sealing a small quantity of castor oil or any other suitable lubricant within the expansible member 20 whereby its natural movement in operation distributes the lubricant to the parts.

It will now be apparent that a complete unitary universal joint has been provided whereby a driving shaft is connected to a driven shaft in such a manner that free relative movement between the two parts is taken care of automatically without the use of the customary slip joint construction and furthermore which is durable, efficient, non-rattling and requiring a minimum amount of lubrication.

Having thus described my invention, I claim:

A universal joint comprising a part connected to a driving shaft, a part connected to a driven shaft, one of said parts terminating in a ball-like end, and the other of said parts terminating in a bearing bore to receive said ball-like end, an annular tubular disc-shaped casing connecting said parts for yielding relative movement, flanges respectively carried by said parts and seating respectively against the inner walls of said casing, said flanges having holes arranged therein, lugs molded to project internally of said casing for interfitting with certain of said flange holes, lugs molded exteriorly of said casing, clamping plates for opposite sides respectively of said casing and having holes to receive said exterior lugs, and clamping devices for holding said flanges, casing and plates clamped together.

Signed at Philadelphia, county of Philadelphia, State of Pennsylvania, this 3rd day of May, 1926.

ALFRED WEILAND.